(12) United States Patent
Mosimann et al.

(10) Patent No.: US 12,441,952 B2
(45) Date of Patent: Oct. 14, 2025

(54) GREEN ODORANT

(71) Applicant: FIRMENICH SA, Satigny (CH)

(72) Inventors: Hervé Mosimann, Satigny (CH); Anthony Alexander Birkbeck, Satigny (CH)

(73) Assignee: FIRMENICH SA, Satigny (CH)

( * ) Notice: Subject to any disclaimer, the term of this patent is extended or adjusted under 35 U.S.C. 154(b) by 742 days.

(21) Appl. No.: 17/757,001

(22) PCT Filed: Jan. 21, 2021

(86) PCT No.: PCT/EP2021/051242
§ 371 (c)(1),
(2) Date: Jun. 7, 2022

(87) PCT Pub. No.: WO2021/148491
PCT Pub. Date: Jul. 29, 2021

(65) Prior Publication Data
US 2023/0032453 A1    Feb. 2, 2023

(30) Foreign Application Priority Data

Jan. 24, 2020  (EP) .................... 20153609

(51) Int. Cl.
*C11B 9/00*    (2006.01)
*C07C 5/05*    (2006.01)
*C07C 29/10*   (2006.01)

(52) U.S. Cl.
CPC .................. *C11B 9/0034* (2013.01)

(58) Field of Classification Search
CPC ....... C07C 29/106; C07C 5/05; C07C 45/513; C07C 13/20; C07C 35/17; C07C 47/225; C07C 2601/14; C07C 2601/16; C07C 2525/02; C11B 9/0034
USPC .................................. 512/22, 8, 1
See application file for complete search history.

(56) References Cited

U.S. PATENT DOCUMENTS

2013/0090390 A1* 4/2013 Singer .................. C11B 9/0034
                                                             568/591
2018/0282660 A1* 10/2018 Moretti ................. C07C 47/225

FOREIGN PATENT DOCUMENTS

| JP | S5547638 A | 4/1980 |
| WO | 2017046071 A1 | 3/2017 |
| WO | 2018114844 A1 | 6/2018 |

OTHER PUBLICATIONS

International Search Report and Written Opinion for corresponding PCT/EP2021/051242 mailed May 4, 2021; 9 pages.

* cited by examiner

*Primary Examiner* — Jessica Whiteley
(74) *Attorney, Agent, or Firm* — Armstrong Teasdale LLP

(57) ABSTRACT

Described herein is a method of using, as a perfuming ingredients, a composition of matter including a compound of formula (I) and a compound of formula (II, which are useful perfuming ingredients of the green, floral/rosy type. Also described herein are a perfuming composition and a perfuming consumer product including same.

13 Claims, No Drawings

GREEN ODORANT

CROSS-REFERENCE TO RELATED APPLICATIONS

This application is a U.S. National Phase Application of PCT/EP2021/051242, filed Jan. 21, 2021, which claims the benefit of priority to European Patent Application No. 20153609.1, filed Jan. 24, 2020, the entire contents of which are hereby incorporated by reference herein.

TECHNICAL FIELD

The present invention relates to the field of perfumery. More particularly, it concerns the use as perfuming ingredient of a composition of matter comprising compound of formula (I) and compound of formula (II) as defined below, which is useful as a perfumery ingredient of the green, floral/rosy type. Therefore, following what is mentioned herein, the present invention comprises the invention's composition of matter as part of a perfuming composition or of a perfumed consumer product.

BACKGROUND OF THE INVENTION

There is a constant need in the perfumery industry to develop novel perfuming ingredients having valuable and powerful organoleptic properties. In parallel, it is highly desirable that, during the manufacture of such ingredients, the environmental footprint is minimized whilst maintaining an acceptable cost. One way of achieving this is to replace petrochemical or fossil fuel derived building blocks with starting materials containing biogenic carbon ie: from renewable sources.

In the effort to limit/minimize the environmental impact of cyclohexenyl propanal derivatives reported in WO2017046071 imparting odor notes of the green, floral type, and in particular the 1:1 mixture of 3-[5-(2-propanyl)-1-cyclohexen-1-yl]propanal and 3-[3-(2-propanyl)-1-cyclohexen-1-yl]propanal, a novel composition of matter has been found comprising compound of formula (I) and compound of formula (II).

In US20130090390, (R)-3-(4-isopropylcyclohex-1-en-1-yl)propanal and (S)-3-(4-isopropylcyclohex-1-en-1-yl)propanal have been disclosed to impart respectively a lily of the valley, floral, sweet, watery, powdery and ozone-like note, and a lily of the valley, fruity, green, watery and aldehydic-like note.

Surprisingly, a synergic effect between compound of formula (I) and compound of formula (II) has been discovered which results in the present composition of matter possessing a fresher and more natural character allied with a rosy aspect while maintaining the green and the floral overall note characteristic of compounds disclosed in WO2017046071. The prior art does not anticipate that the present composition of matter provided such an increase in performance.

SUMMARY OF THE INVENTION

The invention relates to a composition of matter comprising compound of formula (I) and compound of formula (II) imparting an odor which is much appreciated in perfumery.

So, a first object of the present invention is the use as perfuming ingredient of a composition of matter comprising from:

i) 40 to 60% w/w of compound of formula

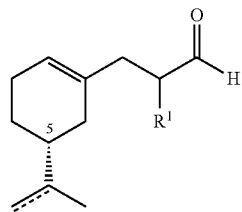

(I)

in the form of any one of its stereoisomers or as a mixture thereof, wherein carbon 5 of the cyclohexenyl group has an absolute R configuration, the dotted line represents a carbon-carbon single bond or a carbon-carbon double bond and $R^1$ represents a hydrogen atom or a $C_{1-3}$ alkyl group; and ii) 40 to 60% w/w of compound of formula

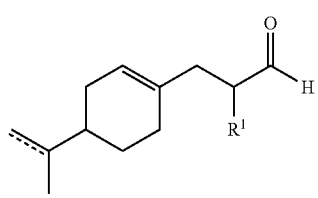

(II)

in the form of any one of its stereoisomers or as a mixture thereof, wherein the dotted line and $R^1$ have the same meaning as in formula (I);

the percentage being relative to the total weight of the composition of matter.

A second object of the present invention is a method to confer, enhance, improve or modify the odor properties of a perfuming composition or of a perfumed article, which method comprises adding to said composition or article an effective amount of the composition of matter as defined above.

A third object of the present invention is a composition of matter comprising 40 to 60% w/w of compound of formula (I) as defined above and 40 to 60% w/w of compound of formula (II) as defined above, the percentage being relative to the total weight of the composition of matter.

Another object of the present invention is a perfuming composition comprising i) at least a composition of matter, as defined above;
ii) at least one ingredient selected from the group consisting of a perfumery carrier and a perfumery base; and
iii) optionally at least one perfumery adjuvant.

A further object of the present invention is a perfumed consumer product comprising a composition of matter, as defined above or a perfuming composition as defined above.

DESCRIPTION OF THE INVENTION

Surprisingly, it has now been discovered that a composition of matter comprising compound of formula (I) and compound of formula (II) possesses a much appreciated green and floral/rosy notes. In addition this composition of matter has never been disclosed.

A first object of the present invention is a composition of matter comprising from:

i) 40 to 60% w/w of compound of formula

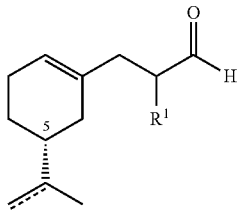

(I)

in the form of any one of its stereoisomers or as a mixture thereof, wherein carbon 5 of the cyclohexenyl group has an absolute R configuration, the dotted line represents a carbon-carbon single bond or a carbon-carbon double bond and $R^1$ represents a hydrogen atom or a $C_{1-3}$ alkyl group; and ii) 40 to 60% w/w of compound of formula

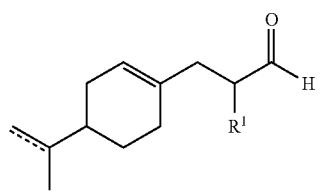

(II)

in the form of any one of its stereoisomers or as a mixture thereof, wherein the dotted line and $R^1$ have the same meaning as in formula (I);

the percentage being relative to the total weight of the composition of matter.

Said composition of matter can be used as perfuming ingredient, for instance to impart odor notes of the green, floral type with rosy connotation.

For the sake of clarity, by the expression "composition of matter", or similar, it is meant the normal meaning understood by a person skilled in the art, i.e. that at least two different compounds (which are not stereoisomers but are regioisomers) are present. According to any one of the above embodiments, the invention's composition of matter may comprise at least one compound of formula (I) in an amount comprised between 40% w/w and 60% w/w at least one compound of formula (II) in an amount comprised between 40% w/w and 60% w/w, relative to the total weight of the composition of matter. Particularly, the invention's composition of matter may comprise compound of formula (I) in an amount comprised between 45% w/w and 55% w/w and compound of formula (II) in an amount comprised between 40% w/w and 50% w/w, relative to the total weight of the composition of matter. The invention's composition of matter may further comprise at most 5% of 3-[(1S,6R)-7,7-dimethylbicyclo[4.1.0]hept-3-en-3-yl]propanal.

For the sake of clarity, by the expression "any one of its stereoisomers or a mixture thereof", or the similar, it is meant the normal meaning understood by a person skilled in the art, i.e. that the compounds of formula (I) and (II) can be a pure or be in the form of a mixture of enantiomers or diastereoisomers, provided of course that the carbon 5 of the cyclohexenyl group of compound of formula (I) has an absolute R configuration. In other words, the compounds of formula (I) and (II) may possess several stereocenters and each of said stereocenter can have two different stereochemistries/configurations (e.g. R or S). The compounds of formula (I) and (II) may even be in the form of a pure enantiomer or in the form of a mixture of enantiomers or diastereoisomers. The compounds of formula (I) and the compounds of formula (II) comprised in the invention's composition of matter can be in a racemic form or scalemic form. Therefore, the compounds of formula (I) and (II) can be each one stereoisomers or in the form of a composition of matter comprising, or consisting of, various stereoisomers.

For the sake of clarity, by the expression "the dotted line represents a carbon-carbon single bond or a carbon-carbon double bond", or the similar, it is meant the normal meaning understood by a person skilled in the art, i.e. that the whole bonding (solid and dotted line) between the carbon atoms connected by said dotted line is a carbon-carbon single or double bond.

For the sake of clarity, by the expression "the dotted line and $R^1$ have the same meaning as in formula (I)", or similar, it is meant the normal meaning understood by a person skilled in the art, i.e. that the invention's composition of matter comprises compounds of formula (I) and (II) wherein $R^1$ group of compound of formula (I) is identical to $R^1$ group of compound of formula (II) and the dotted line of compound of formula (I) is identical to dotted line of compound of formula (II). In other words, the substituents of the compound of formula (I) are identical to the substituents of the compound of formula (II).

According to any one of the above embodiments of the invention, said compounds (I) and (II) are $C_{12}$-$C_{15}$ compounds, in particular $C_{12}$ compounds.

According to any one of the above embodiments of the invention, the dotted line may be a carbon-carbon single bond.

According to any one of the above embodiments of the invention, said $R^1$ may be a hydrogen atom or a methyl group.

According to a particular embodiment of the invention, said $R^1$ may be a hydrogen atom.

According to a particular embodiment of the invention, the invention's composition of matter may comprise from:

i) 40 to 60% w/w of compound of formula

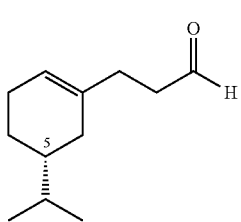

(III)

wherein carbon 5 of the cyclohexenyl group has an absolute R configuration; and ii) 40 to 60% w/w of compound of formula

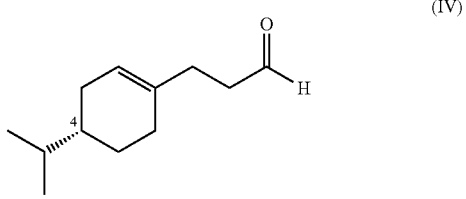

(IV)

wherein carbon 4 of the cyclohexenyl group has an absolute S configuration; the percentage being relative to the total weight of the composition of matter.

According to any one of the above embodiments of the invention, the compound of formula (III) has an ee of at least 80%, even more of at least 85%, even more of at least 90%, even more of at least 95%, even more of at least 98%.

According to any one of the above embodiments of the invention, the compound of formula (IV) has an ee of at least 50%, even more of at least 55%, even more of at least 60%.

For the sake of clarity, the expression "ee" stands for "enantiomeric excess" which is defined as the excess of one enantiomer over the other, expressed as a percentage of the whole and calculated as below wherein R and S are the respective fractions of enantiomers in a mixture:

$$ee=((R-S)/(R+S))\times100$$

In other words, an enantiomeric excess of 80%; i.e. an ee of 80%; corresponds to an enantiomerc ratio of 9:1.

As mentioned above, the composition of matter of the invention possesses a strong and tenacious green odor with floral (lily of the valley but also rosy type) note. The overall profile demonstrates to be of high interest for perfumer since it opens new perspectives to the perfumer's creativity when compared with the prior art racemic or enantiopure analogues.

As specific examples of the invention's composition of matter, one may cite, as non-limiting example, a composition of matter comprising 46% of 3-[(5R)-5-isopropyl-1-cyclohexen-1-yl]propanal and 48% of 3-[(4S)-4-isopropyl-1-cyclohexen-1-yl]propanal. As other example, one may cite a composition of matter comprising 44% of 3-[(5R)-5-isopropyl-1-cyclohexen-1-yl]-2-methyl-1-propanal and 49% of 3-[(4S)-4-isopropyl-1-cyclohexen-1-yl]-2-methyl-1-propanal. Both examples possessing an odor as reported above.

When the odor of the invention's composition of matter is compared with that of the prior art compounds 1:1 mixture of 3-[5-(2-propanyl)-1-cyclohexen-1-yl]propanal and 3-[3-(2-propanyl)-1-cyclohexen-1-yl]propanal reported in WO2017046071 or (S)-3-(4-isopropylcyclohex-1-en-1-yl)propanal as reported in US20130090390, then the invention's compositions of matter distinguish themselves by a clearly fresher green note with a rosy aspect and by lacking the pyrazine and aldehydic note so characteristic of the prior art compound(s). The green note imparted by the invention's compositions of matter tends to bring a more green/floral/vegetal impression whereas the prior art compounds convey a more green/herbaceous note. The odor of the invention's compounds is also lacking, or not possessing significant citrus and violet leaf undernotes which are characteristic of the prior art compounds reported in WO2017046071. In addition, the invention's compositions of matter is devoid of significant sweet, fruity notes which are characteristic of the prior art compounds reported in US20130090390. The invention's composition of matter and both prior art compounds impart green and floral notes with different aspects. The invention's composition of matter is unique in being the only one having a rosy note and the green note is fresher whereas prior art compounds reported in WO2017046071 impart a more assertive note and the prior art compounds reported in US20130090390 confer terpenic and fatty notes.

In other words, both prior art compounds have been described as mainly imparting green and lily of the valley notes, so any composition of matter comprising the prior art compounds should have a reinforced (more prominent) green and/or lily of the valley note with some facet reported for the prior art compounds such as citrus, violet leaf/pyrazine, fruity, watery and aldehydic. However, unexpectedly, the combination of compound of formula (I) and compound of formula (II) leads to the invention's composition of matter without any of these above facets while enriching the floral note with an unexpected rosy character. The loss of the violet leaf/pyrazine aspect renders the invention's composition of matter fresher and in particular fresher than compounds reported in WO2017046071.

Said differences lend the invention's compounds and the prior art compounds to be each suitable for different uses, i.e. to impart different organoleptic impressions.

As mentioned above, the invention concerns the use of a composition of matter comprising compound of formula (I) and compound of formula (II) as a perfuming ingredient. In other words, it concerns a method or a process to confer, enhance, improve or modify the odor properties of a perfuming composition or of a perfumed article or of a surface, which method comprises adding to said composition or article an effective amount of the invention's composition of matter, e.g. to impart its typical note. Understood that the final hedonic effect may depend on the precise dosage and on the organoleptic properties of the invention's composition of matter, but anyway the addition of the invention's composition of matter will impart to the final product its typical touch in the form of a note, touch or aspect depending on the dosage.

By "use of the invention's composition of matter" it has to be understood here also the use of any composition containing a compound of formula (I) and a compound of formula (II) and which can be advantageously employed in the perfumery industry.

Said compositions, which in fact can be advantageously employed as perfuming ingredients, are also an object of the present invention.

Therefore, another object of the present invention is a perfuming composition comprising:

i) as a perfuming ingredient, at least the invention's composition of matter as defined above;

ii) at least one ingredient selected from the group consisting of a perfumery carrier and a perfumery base; and iii) optionally at least one perfumery adjuvant.

By "perfumery carrier" it is meant here a material which is practically neutral from a perfumery point of view, i.e. that does not significantly alter the organoleptic properties of perfuming ingredients. Said carrier may be a liquid or a solid.

As liquid carrier one may cite, as non-limiting examples, an emulsifying system, i.e. a solvent and a surfactant system, or a solvent commonly used in perfumery. A detailed description of the nature and type of solvents commonly used in perfumery cannot be exhaustive. However, one can cite as non-limiting examples, solvents such as butylene or propylene glycol, glycerol, dipropyleneglycol and its monoether, 1,2,3-propanetriyl triacetate, dimethyl glutarate, dimethyl adipate 1,3-diacetyloxypropan-2-yl acetate, diethyl phthalate, isopropyl myristate, benzyl benzoate, benzyl alcohol, 2-(2-ethoxyethoxy)-1-ethano, tri-ethyl citrate or mixtures thereof, which are the most commonly used. For the compositions which comprise both a perfumery carrier and a perfumery base, other suitable perfumery carriers than those previously specified, can be also ethanol, water/ethanol mixtures, limonene or other terpenes, isoparaffins such as those known under the trademark Isopar® (origin: Exxon Chemical) or glycol ethers and glycol ether esters such as those known under the trademark Dowanol® (origin: Dow Chemical Company), or hydrogenated castors oils such as those known under the trademark Cremophor® RH 40 (origin: BASF).

Solid carrier is meant to designate a material to which the perfuming composition or some element of the perfuming composition can be chemically or physically bound. In general such solid carriers are employed either to stabilize the composition, or to control the rate of evaporation of the compositions or of some ingredients. Solid carriers are of current use in the art and a person skilled in the art knows how to reach the desired effect. However by way of non-limiting examples of solid carriers, one may cite absorbing gums or polymers or inorganic materials, such as porous polymers, cyclodextrins, wood based materials, organic or inorganic gels, clays, gypsum talc or zeolites.

As other non-limiting examples of solid carriers, one may cite encapsulating materials. Examples of such materials may comprise wall-forming and plasticizing materials, such as mono, di- or trisaccharides, natural or modified starches, hydrocolloids, cellulose derivatives, polyvinyl acetates, polyvinylalcohols, proteins or pectins, or yet the materials cited in reference texts such as H. Scherz, Hydrokolloide: Stabilisatoren, Dickungs-und Geliermittel in Lebensmitteln, Band 2 der Schriftenreihe Lebensmittelchemie, Lebensmittelqualitat, Behr's Verlag GmbH & Co., Hamburg, 1996. The encapsulation is a well-known process to a person skilled in the art, and may be performed, for instance, by using techniques such as spray-drying, agglomeration or yet extrusion; or consists of a coating encapsulation, including coacervation and complex coacervation techniques.

As non-limiting examples of solid carriers, one may cite in particular the core-shell capsules with resins of aminoplast, polyamide, polyester, polyurea or polyurethane type or a mixture threof (all of said resins are well known to a person skilled in the art) using techniques like phase separation process induced by polymerization, interfacial polymerization, coacervation or altogether (all of said techniques have been described in the prior art), optionally in the presence of a polymeric stabilizer or of a cationic copolymer.

Resins may be produced by the polycondensation of an aldehyde (e.g. formaldehyde, 2,2-dimethoxyethanal, glyoxal, glyoxylic acid or glycolaldehyde and mixtures thereof) with an amine such as urea, benzoguanamine, glycoluryl, melamine, methylol melamine, methylated methylol melamine, guanazole and the like, as well as mixtures thereof. Alternatively one may use preformed resins alkylolated polyamines such as those commercially available under the trademark Urac® (origin: Cytec Technology Corp.), Cymel® (origin: Cytec Technology Corp.), Urecoll® or Luracoll® (origin: BASF).

Other resins are the ones produced by the polycondensation of an a polyol, like glycerol, and a polyisocyanate, like a trimer of hexamethylene diisocyanate, a trimer of isophorone diisocyanate or xylylene diisocyanate or a Biuret of hexamethylene diisocyanate or a trimer of xylylene diisocyanate with trimethylolpropane (known with the tradename of Takenate®, origin: Mitsui Chemicals), among which a trimer of xylylene diisocyanate with trimethylolpropane and a Biuret of hexamethylene diisocyanate are preferred.

Some of the seminal literature related to the encapsulation of perfumes by polycondensation of amino resins, namely melamine based resins with aldehydes includes articles such as those published by K. Dietrich et al. Acta Polymerica, 1989, vol. 40, pages 243, 325 and 683, as well as 1990, vol. 41, page 91. Such articles already describe the various parameters affecting the preparation of such core-shell microcapsules following prior art methods that are also further detailed and exemplified in the patent literature. US 4'396'670, to the Wiggins Teape Group Limited is a pertinent early example of the latter. Since then, many other authors have enriched the literature in this field and it would be impossible to cover all published developments here, but the general knowledge in encapsulation technology is very significant. More recent publications of pertinence, which disclose suitable uses of such microcapsules, are represented for example by the article of K. Bruyninckx and M. Dusselier, ACS Sustainable Chemistry & Engineering, 2019, vol. 7, pages 8041-8054.

By "perfumery base" what is meant here is a composition comprising at least one perfuming co-ingredient.

Said perfuming co-ingredient is not of formula (I) or (II). Moreover, by "perfuming co-ingredient" it is meant here a compound, which is used in a perfuming preparation or a composition to impart a hedonic effect. In other words such a co-ingredient, to be considered as being a perfuming one, must be recognized by a person skilled in the art as being able to impart or modify in a positive or pleasant way the odor of a composition, and not just as having an odor.

The nature and type of the perfuming co-ingredients present in the base do not warrant a more detailed description here, which in any case would not be exhaustive, the skilled person being able to select them on the basis of his general knowledge and according to the intended use or application and the desired organoleptic effect. In general terms, these perfuming co-ingredients belong to chemical classes as varied as alcohols, lactones, aldehydes, ketones, esters, ethers, acetates, nitriles, terpenoids, nitrogenous or *sulphurous* heterocyclic compounds and essential oils, and said perfuming co-ingredients can be of natural or synthetic origin.

In particular, one may cite perfuming co-ingredients which are commonly used in perfume formulations, such as:
  Aldehydic ingredients: decanal, dodecanal, 2-methyl-undecanal, 10-undecenal, octanal, nonanal and/or nonenal;
  Aromatic-herbal ingredients: *eucalyptus* oil, camphor, eucalyptol, 5-methyltricyclo[6.2.1.0~2,7~]undecan-4-one, 1-methoxy-3-hexanethiol, 2-ethyl-4,4-dimethyl-1,3-oxathiane, 2,2,7/8,9/10-Tetramethylspiro[5.5]undec-8-en-1-one, menthol and/or alpha-pinene;
  Balsamic ingredients: coumarin, ethylvanillin and/or vanillin;
  Citrus ingredients: dihydromyrcenol, citral, orange oil, linalyl acetate, citronellyl nitrile, orange terpenes, limonene, 1-p-menthen-8-yl acetate and/or 1,4(8)-p-menthadiene;
  Floral ingredients: methyl dihydrojasmonate, linalool, citronellol, phenylethanol, 3-(4-tert-butylphenyl)-2-methylpropanal, hexylcinnamic aldehyde, benzyl acetate, benzyl salicylate, tetrahydro-2-isobutyl-4-methyl-4

(2H)-pyranol, beta ionone, methyl 2-(methylamino) benzoate, (E)-3-methyl-4-(2,6,6-trimethyl-2-cyclohexen-1-yl)-3-buten-2-one, (1E)-1-(2,6,6-trimethyl-2-cyclohexen-1-yl)-1-penten-3-one, 1-(2,6,6-trimethyl-1,3-cyclohexadien-1-yl)-2-buten-1-one, (2E)-1-(2,6,6-trimethyl-2-cyclohexen-1-yl)-2-buten-1-one, (2E)-1-[2,6,6-trimethyl-3-cyclohexen-1-yl]-2-buten-1-one, (2E)-1-(2,6,6-trimethyl-1-cyclohexen-1-yl)-2-buten-1-one, 2,5-dimethyl-2-indanmethanol, 2,6,6-trimethyl-3-cyclohexene-1-carboxylate, 3-(4,4-dimethyl-1-cyclohexen-1-yl)propanal, hexyl salicylate, 3,7-dimethyl-1,6-nonadien-3-ol, 3-(4-isopropylphenyl)-2-methylpropanal, verdyl acetate, geraniol, p-menth-1-en-8-ol, 4-(1,1-dimethylethyl)-1-cyclohexyle acetate, 1,1-dimethyl-2-phenylethyl acetate, 4-cyclohexyl-2-methyl-2-butanol, amyl salicylate, high cis methyl dihydrojasmonate, 3-methyl-5-phenyl-1-pentanol, verdyl proprionate, geranyl acetate, tetrahydro linalool, cis-7-p-menthanol, propyl (S)-2-(1,1-dimethylpropoxy)propanoate, 2-methoxynaphthalene, 2,2,2-trichloro-1-phenylethyl acetate, 4/3-(4-hydroxy-4-methylpentyl)-3-cyclohexene-1-carbaldehyde, amylcinnamic aldehyde, 8-decen-5-olide, 4-phenyl-2-butanone, isononyle acetate, 4-(1,1-dimethylethyl)-1-cyclohexyl acetate, verdyl isobutyrate and/or mixture of methylionones isomers;

Fruity ingredients: gamma-undecalactone, 2,2,5-trimethyl-5-pentylcyclopentanone, 2-methyl-4-propyl-1,3-oxathiane, 4-decanolide, ethyl 2-methyl-pentanoate, hexyl acetate, ethyl 2-methylbutanoate, gamma-nonalactone, allyl heptanoate, 2-phenoxyethyl isobutyrate, ethyl 2-methyl-1,3-dioxolane-2-acetate, 3-(3,3/1,1-dimethyl-5-indanyl)propanal, diethyl 1,4-cyclohexanedicarboxylate, 3-methyl-2-hexen-1-yl acetate, 1-[3,3-dimethylcyclohexyl]ethyl [3-ethyl-2-oxiranyl]acetate and/or diethyl 1,4-cyclohexane dicarboxylate;

Green ingredients: 2-methyl-3-hexanone (E)-oxime, 2,4-dimethyl-3-cyclohexene-1-carbaldehyde, 2-tert-butyl-1-cyclohexyl acetate, styrallyl acetate, allyl (2-methylbutoxy)acetate, 4-methyl-3-decen-5-ol, diphenyl ether, (Z)-3-hexen-1-ol and/or 1-(5,5-dimethyl-1-cyclohexen-1-yl)-4-penten-1-one;

Musk ingredients: 1,4-dioxa-5,17-cycloheptadecanedione, (Z)-4-cyclopentadecen-1-one, 3-methylcyclopentadecanone, 1-oxa-12-cyclohexadecen-2-one, 1-oxa-13-cyclohexadecen-2-one, (9Z)-9-cycloheptadecen-1-one, 2-{15)-1-[(1R)-3,3-dimethylcyclohexyl]ethoxy}-2-oxoethyl propionate 3-methyl-5-cyclopentadecen-1-one, 1,3,4,6,7,8-hexahydro-4,6,6,7,8,8-hexamethyl-cyclopenta-g-2-benzopyrane, (1S,1'R)-2-[1-(3',3'-dimethyl-1'-cyclohexyl)ethoxy]-2-methylpropyl propanoate, oxacyclohexadecan-2-one and/or (1S,1'R)-[1-(3',3'-dimethyl-1'-cyclohexyl) ethoxycarbonyl]methyl propanoate, Woody ingredients: 1-[(1RS,6SR)-2,2,6-trimethylcyclohexyl]-3-hexanol, 3,3-dimethyl-5-[(1R)-2,2,3-trimethyl-3-cyclopenten-1-yl]-4-penten-2-ol, 3,4'-dimethylspiro[oxirane-2,9'-tricyclo[6.2.1.0$^{2,7}$]undec[4]ene, (1-ethoxyethoxy)cyclododecane, 2,2,9,11-tetramethyl-spiro[5.5]undec-8-en-1-yl acetate, 1-(octahydro-2,3,8,8-tetramethyl-2-naphtalenyl)-1-ethanone, patchouli oil, terpenes fractions of patchouli oil, Clearwood®, (1'R, E)-2-ethyl-4-(2',2',3'-trimethyl-3'-cyclopenten-1'-yl)-2-buten-1-ol, 2-ethyl-4-(2,2,3-trimethyl-3-cyclopenten-1-yl)-2-buten-1-ol, methyl cedryl ketone, 5-(2,2,3-trimethyl-3-cyclopentenyl)-3-methylpentan-2-ol, 1-(2,3,8,8-tetramethyl-1,2,3,4,6,7,8,8a-octahydronaphthalen-2-yl)ethan-1-one and/or isobornyl acetate;

Other ingredients (e.g. amber, powdery spicy or watery): dodecahydro-3a,6,6,9a-tetramethyl-naphtho[2,1-b] furan and any of its stereoisomers, heliotropin, anisic aldehyde, eugenol, cinnamic aldehyde, clove oil, 3-(1,3-benzodioxol-5-yl)-2-methylpropanal, 7-methyl-2H-1,5-benzodioxepin-3(4H)-one, 2,5,5-trimethyl-1,2,3,4,4a,5,6,7-octahydro-2-naphthalenol, 1-phenylvinyl acetate, 6-methyl-7-oxa-1-thia-4-azaspiro[4.4]nonan and/or 3-(3-isopropyl-1-phenyl)butanal.

A perfumery base according to the invention may not be limited to the above mentioned perfuming co-ingredients, and many other of these co-ingredients are in any case listed in reference texts such as the book by S. Arctander, Perfume and Flavor Chemicals, 1969, Montclair, New Jersey, USA, or its more recent versions, or in other works of a similar nature, as well as in the abundant patent literature in the field of perfumery. It is also understood that said co-ingredients may also be compounds known to release in a controlled manner various types of perfuming compounds also known as properfume or profragrance. Non-limiting examples of suitable properfume may include 4-(dodecylthio)-4-(2,6,6-trimethyl-2-cyclohexen-1-yl)-2-butanone, 4-(dodecylthio)-4-(2,6,6-trimethyl-1-cyclohexen-1-yl)-2-butanone, trans-3-(dodecylthio)-1-(2,6,6-trimethyl-3-cyclohexen-1-yl)-1-butanone, 2-(dodecylthio)octan-4-one, 2-phenylethyl oxo(phenyl)acetate, 3,7-dimethylocta-2,6-dien-1-yl oxo(phenyl)acetate, (Z)-hex-3-en-1-yl oxo(phenyl)acetate, 3,7-dimethyl-2,6-octadien-1-yl hexadecanoate, bis(3,7-dimethylocta-2,6-dien-1-yl) succinate, (2-((2-methylundec-1-en-1-yl)oxy)ethyl)benzene, 1-methoxy-4-(3-methyl-4-phenethoxybut-3-en-1-yl)benzene, (3-methyl-4-phenethoxybut-3-en-1-yl)benzene, 1-(((Z)-hex-3-en-1-yl) oxy)-2-methylundec-1-ene, (2-((2-methylundec-1-en-1-yl) oxy)ethoxy)benzene, 2-methyl-1-(octan-3-yloxy)undec-1-ene, 1-methoxy-4-(1-phenethoxyprop-1-en-2-yl)benzene, 1-methyl-4-(1-phenethoxyprop-1-en-2-yl)benzene, 2-(1-phenethoxyprop-1-en-2-yl)naphthalene, (2-phenethoxyvinyl)benzene, 2-(1-((3,7-dimethyloct-6-en-1-yl)oxy)prop-1-en-2-yl)naphthalene, (2-((2-pentylcyclopentylidene) methoxy)ethyl)benzene or a mixture thereof.

By "perfumery adjuvant", it is meant here an ingredient capable of imparting additional added benefit such as a color, a particular light resistance, chemical stability, etc. A detailed description of the nature and type of adjuvant commonly used in perfuming composition cannot be exhaustive, but it has to be mentioned that said ingredients are well known to a person skilled in the art. One may cite as specific non-limiting examples the following: viscosity agents (e.g. surfactants, thickeners, gelling and/or rheology modifiers), stabilizing agents (e.g. preservatives, antioxidant, heat/light and or buffers or chelating agents, such as BHT), coloring agents (e.g. dyes and/or pigments), preservatives (e.g. antibacterial or antimicrobial or antifungal or anti irritant agents), abrasives, skin cooling agents, fixatives, insect repellants, ointments, vitamins and mixtures thereof.

It is understood that a person skilled in the art is perfectly able to design optimal formulations for the desired effect by admixing the above mentioned components of a perfuming composition, simply by applying the standard knowledge of the art as well as by trial and error methodologies.

An invention's composition consisting of at least the invention's composition of matter and at least one perfumery carrier consists of a particular embodiment of the invention as well as a perfuming composition comprising at least the invention's composition of matter, at least one perfumery carrier, at least one perfumery base, and optionally at least one perfumery adjuvant.

According to a particular embodiment, the compositions mentioned above enable, comprise more than one compound of formula (I) and more than one compound of formula (II) enabling the perfumer to prepare accords or perfumes possessing the odor tonality of various the invention's composition of matter, creating thus new building block for creation purposes.

For the sake of clarity, it is also understood that any mixture resulting directly from a chemical synthesis, e.g. a reaction medium without an adequate purification, in which the invention's composition of matter would be involved as a starting, intermediate or end-product could not be considered as a perfuming composition according to the invention as far as said mixture does not provide the inventive composition of matter in a suitable form for perfumery. Thus, unpurified reaction mixtures are generally excluded from the present invention unless otherwise specified.

The invention's composition of matter can also be advantageously used in all the fields of modem perfumery, i.e. fine or functional perfumery, to positively impart or modify the odor of a consumer product into which said the invention's composition of matter is added. Consequently, another object of the present invention consists of a perfumed consumer product comprising, as a perfuming ingredient, at least the invention's composition of matter comprising compound of formula (I) and compound of formula (II), as defined above.

The invention's composition of matter can be added as such or as part of an invention's perfuming composition.

For the sake of clarity, "perfumed consumer product" is meant to designate a consumer product which delivers at least a pleasant perfuming effect to the surface or space to which it is applied (e.g. skin, hair, textile, or home surface). In other words, a perfumed consumer product according to the invention is a perfumed consumer product which comprises a functional formulation, as well as optionally additional benefit agents, corresponding to the desired consumer product, and an olfactive effective amount of at least the invention's composition of matter. For the sake of clarity, said perfumed consumer product is a non-edible product.

The nature and type of the constituents of the perfumed consumer product do not warrant a more detailed description here, which in any case would not be exhaustive, the skilled person being able to select them on the basis of his general knowledge and according to the nature and the desired effect of said product.

Non-limiting examples of suitable perfumed consumer products include a perfume, such as a fine perfume, a splash or eau de parfum, a cologne or a shave or after-shave lotion; a fabric care product, such as a liquid or solid detergent, a fabric softener, a liquid or solid scent booster, a fabric refresher, an ironing water, a paper, a bleach, a carpet cleaner, a curtain-care product; a body-care product, such as a hair care product (e.g. a shampoo, a coloring preparation or a hair spray, a color-care product, a hair shaping product, a dental care product), a disinfectant, an intimate care product; a cosmetic preparation (e.g. a skin cream or lotion, a vanishing cream or a deodorant or antiperspirant (e.g. a spray or roll on), a hair remover, a tanning or sun or after sun product, a nail product, a skin cleansing, a makeup); or a skin-care product (e.g. a soap, a shower or bath mousse, oil or gel, or a hygiene product or a foot/hand care products); an air care product, such as an air freshener or a "ready to use" powdered air freshener which can be used in the home space (rooms, refrigerators, cupboards, shoes or car) and/or in a public space (halls, hotels, malls, etc.); or a home care product, such as a mold remover, a furnisher care product, a wipe, a dish detergent or a hard-surface (e.g. a floor, bath, sanitary or a window-cleaning) detergent; a leather care product; a car care product, such as a polish, a wax or a plastic cleaner.

Some of the above-mentioned perfumed consumer products may represent an aggressive medium for the invention's composition of matter, so that it may be necessary to protect the latter from premature decomposition, for example by encapsulation or by chemically binding it to another chemical which is suitable to release the invention's composition of matter upon a suitable external stimulus, such as an enzyme, light, heat or a change of pH.

The proportions in which the composition of matter according to the invention can be incorporated into the various aforementioned products or compositions vary within a wide range of values. These values are dependent on the nature of the article to be perfumed and on the desired organoleptic effect as well as on the nature of the co-ingredients in a given base when the composition of matter according to the invention are mixed with perfuming co-ingredients, solvents or additives commonly used in the art.

For example, in the case of perfuming compositions, typical concentrations are in the order of 0.001% to 10% by weight, or even more, of the composition of matter of the invention based on the weight of the composition into which they are incorporated. In the case of perfumed consumer product, typical concentrations are in the order of 0.0001% to 1% by weight, or even more, of the composition of matter of the invention based on the weight of the consumer product into which they are incorporated.

The invention's composition of matter can be prepared according to a method reported in the literature or standard methods known in the art as described herein-below.

EXAMPLES

The invention will now be described in further detail by way of the following examples, wherein the abbreviations have the usual meaning in the art, the temperatures are indicated in degrees centigrade (° C.). NMR spectra were acquired using either a Bruker Avance II Ultrashield 400 plus operating at 400 MHz, ($^1$H) and 100 MHz ($^{13}$C) or a Bruker Avance III 500 operating at 500 MHz ($^1$H) and 125 MHz ($^{13}$C) or a Bruker Avance III 600 cryoprobe operating at 600 MHz ($^1$H) and 150 MHz ($^{13}$C). Spectra were internally referenced relative to tetramethyl silane 0.0 ppm. $^1$H NMR signal shifts are expressed in S ppm, coupling constants (J) are expressed in Hz with the following multiplicities: s, singlet; d, doublet; t, triplet; q, quartet; m, multiplet; b, broad (indicating unresolved couplings) and were interpreted using Bruker Topspin software. $^{13}$C NMR data are expressed in chemical shift S ppm and hybridization from DEPT 90 and DEPT 135 experiments, s, quaternary; d, methine; t, methylene; q, methyl.

Example 1

Synthesis of the invention's composition of matter comprising 3-[(5R)-5-isopropyl-1-cyclohexen-1-yl]propanal and 3-[(4S)-4-isopropyl-1-cyclohexen-1-yl]propanal Step 1: M-Menthene/p-Menthene Mixture Limonene/sylvestrene mixture (43% sylvestrene, 48% limonene, 350.0 g, 2.28 mol., 1.0 eq.), ethanol (100.0 g, 28.6% w/w) and Raney nickel (3.5 g) were charged into a 1 L autoclave. The autoclave was purged with nitrogen, pressurised with hydrogen (2.0 bar) and heated up to 40° C. After 10 hours, the hydrogen pressure was released, the mixture was cooled and the autoclave was purged with nitrogen. The mixture was filtered through a fritted funnel. Water (186.4 g) was added, the mixture was stirred during 5 minutes and then allowed to decant. The aqueous phase was discarded. White mineral oil (37.2 g) was charged and the mixture was dried azeotropically under reduced pressure (150 mbar). The product was then distilled (p=150-30 mbar, Tvap=112-55° C.) affording a colourless liquid (343 g, 96% yield).

$^{13}$C NMR: m-menthene: 134.0 (s), 120.9 (d), 40.6 (d), 33.8 (t), 32.4 (d), 26.0 (t), 25.9 (t), 23.9 (q), 19.9 (q), 19.6 (q). p-menthene: 133.9 (s), 121.1 (d), 40.1 (d), 32.4 (d), 30.9 (t), 29.0 (t), 26.6 (t), 23.5 (q), 20.0 (q), 19.7 (q).

Step 2: mixture of (4S)-1,2-epoxy-p-menthane and (5R)-1,2-epoxy-m-menthane

A mixture of m/p-menthene (200.0 g, 1.25 mol., 1.0 eq.) and potassium bicarbonate (25.0 g, 0.25 mol., 0.2 eq.) was heated to 30° C. under stirring. Aqueous peracetic acid (34.2%, 152.5 g, 0.69 mol., 0.55 eq.) was slowly added over 1.5 hours. 1 hour after the end of the addition, water (50.0 g) was charged and the mixture was stirred during 5 minutes. The mixture was allowed to settle. The aqueous phase was removed and discarded. The organic phase was washed with 10% aqueous sodium carbonate (100.0 g) and water (100.0 g). Potassium bicarbonate (25.0 g, 0.25 mol., 0.2 eq.) was charged. Aqueous peracetic acid (34.2%, 171.5 g, 0.77 mol., 0.62 eq.) was added in 1.5 hours. 1.5 hour after the end of the addition, water (50.0 g) was charged and the mixture was stirred during 5 minutes. The mixture was allowed to settle. The aqueous phase was removed and discarded. The organic phase was washed with 10% aqueous sodium carbonate (100.0 g) and water (100.0 g). Crude product (210.1 g) was flash distilled (p=10-1 mbar, Tvap=54-89° C.) after addition of epoxidised linseed oil (10.75 g) affording a colourless liquid (201.3 g, purity: 84%, 88% yield). The product was further purified by distillation through an 80 cm column packed with Sulzer DX gauze (p=20 mbar, Tvap=75-76° C.) after addition of epoxidised linseed oil.

Step 3: mixture of (5S)-5-isopropyl-2-methylenecyclohexan-1-ol and (4R)-4-isopropyl-2-methylenecyclohexanol A mixture of white mineral oil (20.0 g), chromium (III) 2-ethylhexanoate (70% in mineral oil, 1.49 g, 2.16 mmol., 0.0035 eq.) and 2-aminophenol (0.84 g, 7.73 mmol., 0.0125 eq.) was heated to 210° C. with stirring and a mixture of (4S)-1,2-epoxy-p-menthane and (5R)-1,2-epoxy-m-menthane (100.0 g, 618 mmol., 1.0 eq.) was added over 6 hours. 1.5 hour after the end of the addition, the mixture was cooled to 25° C. Crude product (119.8 g) was flash distilled (p=1 mbar, Tvap=54-96° C.) affording a yellow liquid (90.4 g, purity: 90%, 85% yield) used as such in the next step.

$^{13}$C NMR: (1R,4R)-4-isopropyl-2-methylenecyclohexan-1-ol: 151.7 (s), 103.8 (t), 72.8 (d), 45.5 (d), 37.8 (t), 36.6 (t), 32.3 (d), 28.0 (t), 19.9 (2q). (1S,4R)-4-isopropyl-2-methylenecyclohexan-1-ol: 150.5 (s), 109.1 (t), 72.2 (d), 45.1 (d), 34.1 (t), 33.6 (t), 31.8 (d), 23.6 (t), 19.9 (q), 19.8 (q). (1R,5S)-5-isopropyl-2-methylenecyclohexan-1-ol: 150.6 (s), 109.2 (t), 72.4 (d), 37.5 (t), 37.0 (d), 31.9 (d), 30.5 (t), 30.0 (t), 19.9 (q), 19.7 (q). (1S,5S)-5-isopropyl-2-methylene-cyclohexan-1-ol: 152.0 (s), 103.3 (t), 72.4 (d), 43.0 (d), 40.5 (t), 33.8 (t), 32.3 (d), 30.7 (t), 19.9 (q), 19.8 (q).

Step 4: mixture of 3-[(5R)-5-isopropyl-1-cyclohexen-1-yl]propanal and 3-[(4S)-4-isopropyl-1-cyclohexen-1-yl]propanal A mixture of the product from the previous step (20.0 g, 117 mmol., 1.0 eq.), triethyleneglycol divinyl ether (28.3 g, 140 mmol., 1.2 eq.) and mercury (II) acetate (1.86 g, 5.8 mmol., 0.05 eq.) was heated to 140° C. with stirring for 4 hours. The mixture was cooled to 25° C. and a mixture of acetic acid (20.0 g), water (5.0 g) and sodium acetate (5.0 g) was added. The mixture was heated under reflux for 1 hour and cooled to 25° C. Heptane (40.0 g) and water (40.0 g) were added and the mixture was allowed to settle. The aqueous phase and a small amount of liquid mercury were removed and discarded. The organic phase was washed with water (40.0 g). The solvent was evaporated and the crude product (24.9 g) was bulb to bulb distilled (p=0.2 mbar). The product (17.1 g, purity: 72%, 62% yield) was further purified by distillation through a 12 cm column packed with glass rings (p=0.1 mbar, Tvap=40-48° C.) after addition of white mineral oil providing a composition of matter comprising 46% of 3-[(5R)-5-isopropyl-1-cyclohexen-1-yl]propanal and 48% of 3-[(4S)-4-isopropyl-1-cyclohexen-1-yl]propanal.

$^{13}$C NMR: 3-[(5R)-5-isopropyl-1-cyclohexen-1-yl]propanal: 202.8 (d), 135.6 (s), 121.7 (d), 41.9 (t), 40.4 (d), 32.3 (d), 32.3 (t), 30.1 (t), 25.9 (t), 25.8 (t), 19.9 (q), 19.6 (q). 3-[(4S)-4-isopropyl-1-cyclohexen-1-yl]propanal: 202.8 (d), 135.6 (s), 121.8 (d), 41.9 (t), 40.0 (d), 32.2 (d), 29.8 (t), 29.2 (t), 28.9 (t), 26.3 (t), 19.9 (q), 19.7 (q).

Example 2

Synthesis of the invention's composition of matter comprising 3-[(5R)-(5-(prop-1-en-2-yl)cyclohex-1-en-1-yl]propanal and 3-[(4S)-4-(prop-1-en-2-yl) cyclohex-1-en-1-yl]propanal Step 1: mixture of (4S)-1,2-epoxy-p-menthene and (5R)-1,2-epoxy-m-menthene A mixture of limonene/sylvestrene mixture (43% sylvestrene, 48% limonene, 500.0 g, 3.23 mol., 1.0 eq) and potassium bicarbonate (49.0 g, 0.48 mol., 0.3 eq.) was heated to 30° C. under stirring and aqueous peracetic acid (32.9%, 280.3 g, 1.21 mol., 0.375 eq.) was added over 1.5 hours. 1 hour after the end of the addition, water (125.0 g) was charged and the mixture was stirred during 5 minutes. The mixture was allowed to settle. The aqueous phase was removed and discarded. The organic phase was washed with 10% aqueous sodium carbonate (250.0 g) and water (166.0 g). Potassium bicarbonate (49.0 g, 0.48 mol., 0.3 eq.) was charged. Aqueous peracetic acid (32.9%, 280.3 g, 1.21 mol., 0.375 eq.) was added in 1.5 hours. 1.5 hour after the end of the addition, water (125.0 g) was charged and the mixture was stirred during 5 minutes. The mixture was allowed to settle. The aqueous phase was removed and discarded. The organic phase was washed with 10% aqueous sodium carbonate (250.0 g) and water (250.0 g). Crude product (507.3 g) was flash distilled (p=10-1 mbar, Tvap=83-99° C.) after addition of epoxidised linseed oil (26.3 g) affording a colourless liquid (472.7 g, purity: 48%, contains 39.4% limonene/sylvestrene). The product was further purified by distillation through an 80 cm column packed with Sulzer DX gauze (p=20 mbar) after addition of epoxidised linseed oil (30.1 g). Two products were collected:

Limonene/sylvestrene mixture (b.p: 59-62° C.): 178.8 g (purity: 86%, 34% yield)

Mixture of epoxides (b.p: 77-79° C.): 209.0 g (purity: 99%, 42% yield)

Step 2: mixture of (5S)-5-isopropenyl-2-methylene-cyclohexan-1-ol and (4R)-4-isopropenyl-2-methyl-enecyclohexanol The procedure of example 1, step 3 was used starting with the product of the previous step (85.0 g, 554 mmol.). After flash distillation (p=1 mbar, Tvap=55-68° C.) a yellow liquid (77.9 g, purity: 91%, 84% yield) was obtained and used as such in the next step.

$^{13}$C NMR: (1R,5S)-5-isopropyl-2-methylenecyclohexan-1-ol: 149.9 (s), 149.4 (s), 109.8 (t), 108.9 (t), 72.3 (d), 39.0 (t), 38.1 (d), 32.6 (t), 30.0 (t), 21.0 (q). (1S,5S)-5-isopropenyl-2-methylenecyclohexan-1-ol: 151.2 (s), 148.6 (s), 109.1 (t), 103.9 (t), 72.1 (d), 44.1 (d), 42.1 (t), 33.8 (t), 32.7 (t), 20.8 (q).

Step 3: mixture of 3-[(5R)-5-isopropenyl-1-cyclo-hexen-1-yl]propanal and 3-[(4S)-4-isopropenyl-1-cyclohexen-1-yl]propanal The procedure of example 1, step 4 was used starting with the product of the previous step (20.0 g, 554 mmol.). After bulb to bulb distillation (p=0.1 mbar), a light yellow liquid (13.1 g, purity: 84%, 49% yield) was obtained. The product was further purified by distillation through a 15 cm Fischer column (p=0.2 mbar, Tvap=38-42° C.) providing a composition of matter comprising 44% of 3-[(5R)-5-isopropenyl-1-cyclohexen-1-yl]propanal and 50% of 3-[(4S)-4-isopropenyl-1-cyclohexen-1-yl]propanal.

$^{13}$C NMR: 3-[(5R)-5-isopropyl-1-cyclohexen-1-yl]propanal: 202.6 (d), 149.8 (s), 135.3 (s), 121.5 (d), 108.7 (t), 41.8 (t), 41.4 (d), 33.9 (t), 29.9 (t), 27.3 (t), 25.6 (t), 20.8 (q). 3-[(4S)-4-isopropenyl-1-cyclohexen-1-yl]propanal: 202.6 (d), 149.8 (s), 135.4 (s), 121.4 (d), 108.6 (t), 41.9 (t), 41.0 (d), 30.7 (t), 29.7 (t), 28.9 (t), 27.7 (t), 20.8 (q).

Example 3

Synthesis of the invention's composition of matter comprising 2-methyl-3-[(5R)-5-isopropenyl-1-cyclohexen-1-yl]propanal and 2-methyl-3-[(4S)-4-isopropenyl-1-cyclohexen-1-yl]propanal Step 1: mixture of ethyl 3-[(5R)-5-isopropenyl-1-cyclohexen-1-yl]-2-methylpropanoate and ethyl 3-[(4S)-4-isopropenyl-1-cyclohexen-1-yl]-2-methyl-propanoate A mixture of triethyl orthopropionate (56.2 g, 316 mmol., 1.3 eq.) and pivalic acid (0.99 g, 9.72 mmol, 0.04 eq.) was heated to 130° C. with stirring. The mixture of (5S)-5-isopropenyl-2-methylenecyclohexan-1-ol and (4R)-4-isopropenyl-2-methylene-cyclohexanol (40.0 g, 243 mmol., 1.0 eq.) was added over 5 hours. During the addition, more pivalic acid was added (0.50 g after 2 h. and 0.50 g after 4 h, 0.04 eq. in total). Ethanol was distilled as it was formed. 1 hour after the end of the addition, the mixture was cooled to 25° C. Crude product (69.4 g, purity: 87%) was distilled through a 12 cm column packed with glass rings (p=0.5 mbar, Tvap=88-89° C.) affording a colourless liquid (48.5 g, purity: 97%, 82% yield).

$^{13}$C NMR: Ethyl 3-[(4S)-4-isopropenyl-1-cyclohexen-1-yl]-2-methylpropanoate: 176.7 (s), 150.0 (s), 134.7 (s), 122.9 (d), 108.5 (t), 60.1 (t), 41.9 (t), 41.0 (d), 37.9 (d), 30.8 (t), 28.5 (t), 27.8 (t), 20.8 (q), 16.7 (q), 14.3 (q). Ethyl 3-[(5R)-5-isopropenyl-1-cyclohexen-1-yl]-2-methylpropanoate: 176.6 (s), 149.9 (s), 134.5 (s), 122.8 (d), 108.5 (t), 60.1 (t), 42.2 (t), 41.5 (d), 37.8 (d), 33.5 (t), 27.4 (t), 25.7 (t), 20.8 (q), 16.9 (q), 14.3 (q).

Step 2: mixture of 3-[(5R)-5-isopropenyl-1-cyclo-hexen-1-yl]-2-methyl-1-propanol and 3-[(4S)-4-isopropenyl-1-cyclohexen-1-yl]-2-methyl-1-propanol A mixture of ethyl 3-[(5R)-5-isopropenyl-1-cyclohexen-1-yl]-2-methylpropanoate and ethyl 3-[(4S)-4-isopropenyl-1-cyclohexen-1-yl]-2-methylpropanoate (45.0 g, 186 mmol., 1.0 eq.), toluene (67.5 g, 150% w/w) and the complex of zinc diethylacetate and N,N-dimethylethanolamine (4.72 g) was heated to 100° C. with stirring. Polymethylhydrosiloxane (28.8 g) was added over 2 hours. 30 minutes after the end of the addition, the mixture was cooled to 25° C. and added in 30 minutes to a solution of potassium hydroxide (45%, 61.3 g, 483 mmol, 2.6 eq.) at 60° C. The mixture was stirred for 30 minutes and allowed to settle. The aqueous phase was removed and discarded. The organic phase was washed sequentially with 10% aqueous sodium chloride (60.0 g), 5% aqueous sulfuric acid (60.0 g), 5% aqueous sodium bicarbonate (60.0 g) and water (60.0 g). The solution was concentrated under reduced pressure and crude product (36.6 g, purity: 93%) was flash distilled (p=1 mbar, Tvap=96-99° C.) affording a colourless liquid (33.3 g, purity: 93%, 86% yield). The product was further purified by distillation through a 50 cm Fischer column (p=1 mbar, Tvap=96-99° C.).

$^{13}$C NMR: 3-[(5R)-5-isopropenyl-1-cyclohexen-1-yl]-2-methyl-1-propanol: 150.1 (s), 135.9 (s), 122.3 (d), 108.5 (t), 68.6 (t), 42.4 (t), 41.6 (d), 33.8 (t), 33.6 (d), 27.5 (t), 25.8 (t), 20.8 (q), 17.0 (q). 3-[(4S)-4-isopropenyl-1-cyclohexen-1-yl]-2-methyl-1-propanol: 150.1 (s), 136.1 (s), 122.3 (d), 108.5 (t), 68.5 (t), 42.3 (t), 41.2 (d), 33.6 (d), 30.8 (t), 28.7 (t), 27.9 (t), 20.8 (q), 16.7 (q).

Step 3: mixture of 3-[(5R)-5-isopropenyl-1-cyclo-hexen-1-yl]-2-methyl-1-propanal and 3-[(4S)-4-isopropenyl-1-cyclohexen-1-yl]-2-methyl-1-propanal A mixture of 3-[(5R)-5-isopropenyl-1-cyclohexen-1-yl]-2-methyl-1-propanol and 3-[(4S)-4-isopropenyl-1-cyclohexen-1-yl]-2-methyl-1-propanol (15.0 g, 77 mmol., 1.0 eq.) in solution in dichloromethane (30.0 g) was added over 30 minutes to a stirred suspension of pyridinium chlorochromate (28.9 g, 134 mmol., 1.75 eq.) in dichloromethane (120.0 g) at 25° C. 5 hours after the end of the addition, silica gel (30.0 g) was added. The mixture was stirred during 10 minutes and then filtered through a short pad of celite. The solid celite pad was rinsed with dichloromethane. The solution was concentrated under reduced pressure and crude product (12.6 g, purity: 93%) was bulb to bulb distilled (p=0.1 mbar) affording a colourless liquid (11.4 g, purity: 95%, 73% yield). The product was further purified by distillation through a 15 cm Fischer column (p=0.2 mbar, Tvap=41-43° C.) providing a composition of matter comprising 48% of 3-[(5R)-5-isopropenyl-1-cyclohexen-1-yl]-

2-methyl-1-propanal and 50% of 3-[(4S)-4-isopropenyl-1-cyclohexen-1-yl]-2-methyl-1-propanal.

$^{13}$C NMR: 3-[(5R)-5-isopropenyl-1-cyclohexen-1-yl]-2-methyl-1-propanal: 205.2 (d), 149.7 (s), 133.8 (s), 123.5 (d), 108.7 (t), 44.2 (d), 41.4 (d), 39.0 (t), 33.7 (t), 27.3 (t), 25.7 (t), 20.7 (q), 13.2 (q). 3-[(4S)-4-isopropenyl-1-cyclohexen-1-yl]-2-methyl-1-propanal: 205.2 (d), 149.8 (s), 133.9 (s), 123.4 (d), 108.6 (t), 44.4 (d), 40.9 (d), 38.8 (t), 30.7 (t), 28.7 (t), 27.7 (t), 20.8 (q), 13.4 (q).

Example 4

Synthesis of the invention's composition of matter comprising 2-methyl-3-[(5R)-5-isopropyl-1-cyclohexen-1-yl]propanal and 2-methyl-3-[(4S)-4-isopropyl-1-cyclohexen-1-yl]propanal Step 1: mixture of ethyl 3-[(5R)-5-isopropyl-1-cyclohexen-1-yl]-2-methylpropanoate and ethyl 3-[(4S)-4-isopropyl-1-cyclohexen-1-yl]-2-methylpropanoate The procedure of example 3, step 1 was used starting with a mixture of (5S)-5-isopropyl-2-methylenecyclohexan-1-ol and (4R)-4-isopropyl-2-methylenecyclohexanol (48.0 g, purity: 89%, 276 mmol.). Crude product (86.1 g, purity: 80%) was distilled through a 12 cm column packed with glass rings (p=0.5 mbar, Tvap=79-80° C.) affording a colourless liquid (46.4 g, purity: 93%, 66% yield).

$^{13}$C NMR: Ethyl 3-[(4S)-4-isopropyl-1-cyclohexen-1-yl]-2-methylpropanoate: 176.8 (s), 134.8 (s), 123.3 (d), 60.1 (t), 42.0 (t), 40.1 (d), 37.9 (d), 32.2 (d), 29.0 (t), 28.7 (t), 26.4 (t), 20.0 (q), 19.7 (q), 16.6 (q), 14.3 (q). Ethyl 3-[(5R)-5-isopropyl-1-cyclohexen-1-yl]-2-methylpropanoate: 176.7 (s), 134.8 (s), 123.2 (d), 60.1 (t), 42.4 (t), 40.5 (d), 38.0 (d), 32.3 (d), 31.7 (t), 25.9 (2t), 19.9 (q), 19.7 (q), 16.9 (q), 14.3 (q).

Step 2: mixture of 3-[(5R)-5-isopropyl-1-cyclohexen-1-yl]-2-methyl-1-propanol and 3-[(4S)-4-isopropyl-1-cyclohexen-1-yl]-2-methyl-1-propanol The procedure of example 3, step 2 was used starting with the product of the previous step (43.0 g, 168 mmol.). Crude product (35.0 g, purity: 86%) was flash-distilled (p=1 mbar, Tvap=97-100° C.) affording a colourless liquid (31.9 g, purity: 91%, 88% yield).

The product was further purified by distillation through a 50 cm Fischer column (p=1 mbar, Tvap=98-100° C.).

$^{13}$C NMR: 3-[(5R)-5-isopropyl-1-cyclohexen-1-yl]-2-methyl-1-propanol: 136.4 (s), 122.6 (d), 68.5 (t), 42.7 (t), 40.6 (d), 33.6 (d), 32.4 (d), 32.1 (t), 26.0 (t), 25.9 (t), 19.9 (q), 19.7 (q), 17.1 (q). 3-[(4S)-4-isopropyl-1-cyclohexen-1-yl]-2-methyl-1-propanol: 136.3 (s), 122.8 (d), 68.6 (t), 42.3 (t), 40.2 (d), 33.6 (d), 32.3 (d), 29.0 (2t), 26.5 (t), 20.0 (q), 19.7 (q), 16.6 (q).

Step 3: mixture of 3-[(5R)-5-isopropyl-1-cyclohexen-1-yl]-2-methyl-1-propanal and 3-[(4S)-4-isopropyl-1-cyclohexen-1-yl]-2-methyl-1-propanal The procedure of example 3, step 2 was used starting with the product of the previous step (13.0 g, 62.8 mmol.). After bulb to bulb distillation (p=0.1 mbar), a colourless liquid (8.6 g, purity: 93%, 66% yield) was obtained comprising 44% of 3-[(5R)-5-isopropyl-1-cyclohexen-1-yl]-2-methyl-1-propanal and 49% of 3-[(4S)-4-isopropyl-1-cyclohexen-1-yl]-2-methyl-1-propanal.

$^{13}$C NMR: 3-[(5R)-5-isopropyl-1-cyclohexen-1-yl]-2-methyl-1-propanal: 205.3 (d), 134.0 (s), 123.7 (d), 44.3 (d), 40.4 (d), 39.2 (t), 32.3 (d), 32.1 (t), 25.9 (t), 25.8 (t), 19.8 (q), 19.6 (q), 13.4 (q). 3-[(4S)-4-isopropyl-1-cyclohexen-1-yl]-2-methyl-1-propanal: 205.4 (d), 134.0 (s), 123.9 (d), 44.5 (d), 40.1 (d), 38.9 (t), 32.2 (d), 29.0 (2t), 26.3 (t), 20.0 (q), 19.7 (q), 13.2 (q).

Example 5

Preparation of a Perfuming Composition

A perfuming composition for fabric enhancer was prepared by admixing the following ingredients:

| Ingredient name | Parts by weight |
|---|---|
| (1R,2R)-1,7,7-trimethyl-bicyclo[2.2.1]hept-2-yl acetate | 400 |
| Benzyl acetate | 20 |
| 1,1-dimethyl-2-phenylethyl acetate | 40 |
| 10% * 3-methyl-2-buten-1-yl acetate | 20 |
| (+−)-1-phenylethyl acetate | 40 |
| Tricyclo[5.2.1.0$^{2,6}$]dec-3/4-en-8-yl acetate | 400 |
| 10-undecenal | 140 |
| (2E)-2-benzylideneoctanal | 400 |
| Allyl (2/3-methylbutoxy)acetate | 10 |
| Methyl 2-aminobenzoate | 60 |
| 10% * (+−)-Ethyl 2-methylpentanoate | 20 |
| Artemisia oil | 10 |
| Methyl benzoate | 20 |
| (+−)-1,7,7-trimethylbicyclo[2.2.1]heptan-2-one | 40 |
| (3aRS,5aSR,9aSR,9bRS)-3a,6,6,9a-tetramethyldodecahydronaphtho[2,1-b]furan | 40 |
| 10% * 4-(4-hydroxyphenyl)-2-butanone | 40 |
| Benzyl (E)-3-phenyl-2-propenoate | 40 |
| (+−)-3,7-dimethyl-6-octen-1-ol | 200 |
| Clearwood ®$^{1)}$ | 20 |
| Coumarin | 100 |
| (−)-(2E)-2-ethyl-4-[(1R)-2,2,3-trimethyl-3-cyclopenten-1-yl]-2-buten-1-ol | 40 |
| (2E)-1-[(1RS,2SR)-2,6,6-trimethyl-3-cyclohexen-1-yl]-2-buten-1-one | 20 |
| (+−)-2,6-dimethyl-7-octen-2-ol | 400 |
| 1,1'-oxydibenzene | 40 |
| 4-(2-methyl-2-propanyl)cyclohexyl acetate | 200 |
| 3-ethoxy-4-hydroxybenzaldehyde | 80 |
| 1,3,3-trimethyl-2-oxabicyclo[2.2.2]octane | 40 |
| 2-methoxy-4-(2-propen-1-yl)phenol | 100 |
| (+−)-5-heptyldihydro-2 (3H)-furanone | 40 |
| 3,7-dimethyl-2,6-octadien-1-ol | 20 |
| 1-oxa-12/13-cyclohexadecen-2-one | 1600 |
| Methyl 2-(3-oxo-2-pentylcyclopentyl)acetate | 100 |
| Benzo[d][1,3]dioxole-5-carbaldehyde | 20 |
| (+)-(1S,1'R)-2-[1-(3',3'-dimethyl-1'-cyclohexyl)ethoxy]-2-methylpropyl propanoate | 600 |
| 4,4a,5,9b-tetrahydro-indeno[1,2-d]-1,3-dioxin | 20 |
| 1-(octahydro-2,3,8,8-tetramethyl-2-naphtalenyl)-1-ethanone | 800 |
| 10% * (+−)-6/8-sec-butylquinoline | 80 |
| (+−)-(3E)-3-methyl-4-(2,6,6-trimethyl-2-cyclohexen-1-yl)-3-buten-2-one and (+−)-(1E)-1-(2,6,6-trimethyl-2-cyclohexen-1-yl)-1-penten-3-one | 40 |
| (+−)-2-methyl-3-[4-(2-methyl-2-propanyl)phenyl]propanal | 800 |
| (+)-Limonene | 40 |
| (+−)-3,7-dimethyl-1,6-octadien-3-ol | 200 |
| 1,2-dimethoxy-4-[1-propen-1-yl]benzene | 10 |
| 1-methoxy-4-methylbenzene | 10 |
| Methyl 2,4-dihydroxy-3,6-dimethylbenzoate | 40 |
| 4-methyl-2-(2-methyl-1-propen-1-yl)tetrahydro-2H-pyran | 20 |
| Patchouli oil | 20 |
| 2-phenylethanol | 400 |
| 2-phenylethyl phenylacetate | 60 |
| 9-decen-1-ol | 40 |
| (+−)-2,2,2-trichloro-1-phenylethyl acetate | 400 |

-continued

| Ingredient name | Parts by weight |
|---|---|
| Amyl salicylate | 600 |
| 10% * Methyl 2-hydroxybenzoate | 40 |
| (3Z)-3-hexen-1-yl salicylate | 400 |
| (+−)-Alpha-terpineol | 40 |
| (+−)-3,7-dimethyl-3-octanol | 20 |
| 2-(2-methyl-2-propanyl)cyclohexyl acetate | 200 |
| 2-methoxynaphthalene | 80 |
| 2,4-Dimethyl-3-cyclohexene-1-carbaldehyde | 80 |
| | 9800 |

* in dipropyleneglycol
[1] origin: Firmenich SA, Geneva, Switzerland

The addition of 200 parts by weight of the invention's composition of matter comprising 3-[(5R)-5-isopropyl-1-cyclohexen-1-yl]propanal and 3-[(4S)-4-isopropyl-1-cyclohexen-1-yl]propanal as prepared in example 1 to the above-described composition imparted to the latter a connotation in the direction of green stem while being fresh and natural. The invention's composition of matter reinforce the fresh floral facet of the composition. The invention's composition of matter blended particularly well with floral/rosy element of the composition such as 1,1-dimethyl-2-phenylethyl acetate, (+−)-3,7-dimethyl-6-octen-1-ol, 3,7-dimethyl-2,6-octadien-1-ol, and 2-phenylethanol.

The addition of the same amount of the prior art 1:1 mixture of 3-[5-(2-propanyl)-1-cyclohexen-1-yl]propanal and 3-[3-(2-propanyl)-1-cyclohexen-1-yl]propanal instead of the invention's composition of matter provided a more fatty/green connotation more aggressive and less natural. Said prior art mixture did not boost the freshness of the composition as the invention's composition of matter. The prior art mixture blended particularly well with green element of the composition such as allyl (2/3-methylbutoxy) acetate and 2,4-Dimethyl-3-cyclohexene-1-carbaldehyde.

The addition of the same amount of the prior art 3-[(4S)-4-isopropyl-1-cyclohexen-1-yl]propanal instead of the invention's composition of matter provided a slightly greener and more citrus-terpenic connotation. The impact on the composition was weaker.

Example 6

Preparation of a Eau De Toilette Comprising the Invention's Composition of Matter The eau de toilette is prepared by adding 12% by weight, relative to the total weight of the eau de toilette, of the invention's composition of example 5 into ethanol.

Example 7

Preparation of a Liquid Detergent Comprising the Invention's Compound

TABLE 1

Composition of the liquid detergent formulation

| Ingredients | Concentration [wt %] |
|---|---|
| Sodium C14-17 Alkyl Sec Sulfonate[1] | 7 |
| Fatty acids, C12-18 and C18-unsaturated[2] | 7.5 |
| C12/14 fatty alcohol poly glycol ether with 7 mol EO[3] | 17 |

TABLE 1-continued

Composition of the liquid detergent formulation

| Ingredients | Concentration [wt %] |
|---|---|
| Triethanolamine | 7.5 |
| Propylene Glycol | 11 |
| Citric acid | 6.5 |
| Potassium Hydroxyde | 9.5 |
| Properase L[4] | 0.2 |
| Puradax EG L[4] | 0.2 |
| Purastar ST L[4] | 0.2 |
| Acrylates/Steareth-20 Methacrylate structuring Crosspolymer[5] | 6 |
| Deionized Water | 27.4 |

[1] Hostapur SAS 60; Origin: Clariant
[2] Edenor K 12-18; Origin: Cognis
[3] Genapol LA 070; Origin: Clariant
[4] Origin: Genencor International
[5] Aculyn 88; Origin: Dow Chemical The liquid detergent is prepared by adding 0.5 to 1.5% by weight, relative to the total weight of the liquid detergent, of the invention's perfuming composition of example 5 into the unperfumed liquid detergent formulation of Table 1 under gentle shaking.

Example 8

Preparation of a Fabric Softener Comprising the Invention's Compound

TABLE 2

Composition of the softener formulation

| Ingredient | Concentration [wt %] |
|---|---|
| Methyl bis[ethyl (tallowate)]-2-hydroxyethyl ammonium methyl sulfate[1] | 12.20 |
| 1,2-benzisothiazolin-3-one[2] | 0.04 |
| CaCl$_2$ (10% aqueous solution) | 0.40 |
| Water | 87.36 |

[1] Stepantex VL90 A Diester Quat; Origin: Stepan
[2] Proxel GXL; Origin: Arch

The softener is prepared by weighting Methyl bis[ethyl (tallowate)]-2-hydroxyethyl ammonium methyl sulfate which was heated at 65° C. Then Water and 1,2-benzisothiazolin-3-one are placed in the reactor and are heated at 65° C. under stirring. To the above mixture is added Methyl bis[ethyl (tallowate)]-2-hydroxyethyl ammonium methyl sulfate. The mixture is stirred 15 minutes and CaCl$_2$ is added. Then 0.5 to 2% by weight, relative to the total weight of the softener, of the invention's perfuming composition of example 5 is added. The mixture is stirred 15 minutes and is cooled down to room temperature under stirring (viscosity measure: result 35+/−5 mPas. (shear rate 106 sec-1)).

Example 9

Preparation of a Transparent Isotropic Shampoo Comprising the Invention's Composition

TABLE 3

Composition of the transparent isotropic shampoo formulation

| Phases | Ingredients | Concentration [wt %] |
|---|---|---|
| A | Water deionized | 44.4 |
|   | Polyquaternium-10 [1] | 0.3 |
|   | Glycerin 85% [2] | 1 |
|   | DMDM Hydantoin [3] | 0.2 |
| B | Sodium Laureth Sulfate [4] | 28 |
|   | Cocamidopropyl Betaine [5] | 3.2 |
|   | Disodium Cocoamphodiacetate [6] | 4 |
|   | Ethoxy (20) Stearyl Alcohol [6] | 1 |
| C | Sodium Laureth Sulfate [4] | 3 |
|   | Glyceryl Laureate [7] | 0.2 |
| D | Water deionized | 1 |
|   | Sodium Methylparaben [8] | 0.1 |
| E | Sodium Chloride 10% aqueous sol. | 15 |
|   | Citric acid 10% aqueous sol. till pH 5.5-6 | q.s. |

[1] Ucare Polymer JR-400, Origin: Noveon
[2] Origin: Schweizerhall
[3] Glydant, Origin: Lonza
[4] Texapon NSO IS, Origin: Cognis
[5] Tego Betain F 50, Origin: Evonik
[6] Amphotensid GB 2009, Origin: Zschimmer & Schwarz
[7] Monomuls 90 L-12, Origin: Gruenau
[8] Nipagin Monosodium, Origin: NIPA The shampoo is prepared by dispersed in water Polyquaternium-10. The remaining ingredients of phase A are mixed separately by addition of one after the other while mixing well after each adjunction. This pre-mix is added to the Polyquaternium-10 dispersion and mixed for another 5 min. Then, the premixed phase B and the premixed Phase C are added (Monomuls 90L-12 is heated to melt in Texapon NSO IS) while agitating. Phase D and Phase E are added while agitating. PH is adjusted with citric acid solution till pH: 5.5-6.0 leading to an unperfumed shampoo formulae.

The perfumed shampoo is prepared by adding 0.4 to 0.8% by weight, relative to the total weight of the shampoo, of the invention's perfuming composition of example 5 into the unperfumed shampoo formulation of Table 3 under gentle shaking.

Example 10

Preparation of a Structured Shower Gel Comprising the Invention's Composition

TABLE 4

Composition of the shower gel formulation

| Ingredients | Amount (% wt) |
|---|---|
| WATER deionised | 49.350 |
| Tetrasodium EDTA [1] | 0.050 |
| Acrylates Copolymer [2] | 6.000 |
| Sodium C12-C15 Pareth Sulfate [3] | 35.000 |
| Sodium Hydroxide 20% aqueous solution | 1.000 |
| Cocamidopropyl Betaine [4] | 8.000 |

TABLE 4-continued

Composition of the shower gel formulation

| Ingredients | Amount (% wt) |
|---|---|
| Methylchloroisothiazolinone and Methylisothiazolinone [5] | 0.100 |
| Citric Acid (40%) | 0.500 |

[1] EDETA B POWDER; trademark and origin: BASF
[2] CARBOPOL AQUA SF-1 POLYMER; trademark and origin: NOVEON
[3] ZETESOL AO 328 U; trademark and origin: ZSCHIMMER & SCHWARZ
[4] TEGO-BETAIN F 50; trademark and origin: GOLDSCHMIDT
[5] KATHON CG; trademark and origin: ROHM & HASS The shower gel is prepared by adding 0.5 to 1.5% by weight, relative to the total weight of the shower gel, of the invention's perfuming composition of example 5 into the unperfumed shower gel formulation of Table 4 under gentle shaking.

Example 11

Preparation of a Transparent Shower Gel Comprising the Invention's Composition

TABLE 5

Composition of the transparent shower gel formulation

| Ingredients | Concentration (% wt) |
|---|---|
| WATER deionized | 52.40 |
| Tetrasodium EDTA [1] | 0.10 |
| Sodium Benzoate | 0.50 |
| Propylene Glycol | 2.00 |
| Sodium C12-C15 Pareth Sulfate [2] | 35.00 |
| Cocamidopropyl Betaine [3] | 8.00 |
| Polyquaternium-7 [4] | 0.20 |
| Citric Acid (40%) | 1.00 |
| Sodium Chloride | 0.80 |

[1] EDETA B POWDER; trademark and origin: BASF
[2] ZETESOL AO 328 U; trademark and origin: ZSCHIMMER & SCHWARZ
[3] TEGO-BETAIN F 50; trademark and origin: GOLDSCHMIDT
[4] MERQUAT 550; trademark and origin: LUBRIZOL The transparent shower gel is prepared by adding 0.5 to 1.5% by weight, relative to the total weight of the shower gel, of the invention's perfuming composition of example 5 into the unperfumed shower gel formulation of Table 5 under gentle shaking.

Example 12

Preparation of a Milky Shower Gel Comprising the Invention's Composition

TABLE 6

Composition of the milky shower gel formulation

| Ingredients | Concentration (% wt) |
|---|---|
| WATER deionized | 50.950 |
| Tetrasodium EDTA [1] | 0.050 |
| Sodium Benzoate | 0.500 |
| Glycerin 86% | 3.500 |
| Sodium Laureth Sulfate [2] | 27.000 |
| Polyquaternium-7 [3] | 1.000 |
| Coco-Betaine [4] | 6.000 |
| PEG-120 Methyl Glucose trioleate [5] | 1.000 |

TABLE 6-continued

Composition of the milky shower gel formulation

| Ingredients | Concentration (% wt) |
|---|---|
| Citric Acid (40%) | 1.000 |
| Glycol Distearate & Laureth-4 & Cocamidopropyl Betaine[6] | 3.000 |
| Sodium Chloride 20% | 5.000 |
| PEG-40 Hydrogenated Castor Oil[7] | 1.000 |

[1] EDETA B POWDER; trademark and origin: BASF
[2] Texapon NSO IS; trademark and origin: COGNIS
[3] MERQUAT 550; trademark and origin: LUBRIZOL
[4] DEHYTON AB-30; trademark and origin: COGNIS
[5] GLUCAMATE LT; trademark and origin: LUBRIZOL
[6] EUPERLAN PK 3000 AM; trademark and origin: COGNIS
[7] CREMOPHOR RH 40; trademark and origin: BASF The transparent shower gel is prepared by adding 0.5 to 1.5% by weight, relative to the total weight of the shower gel, of the invention's perfuming composition of example 5 into the unperfumed shower gel formulation of Table 6 under gentle shaking.

Example 13

Preparation of a Pearly Shampoo Comprising the Invention's Composition

TABLE 7

Composition of the pearly isotropic shampoo formulation

| Phases | Ingredients | Concentration (% wt) |
|---|---|---|
| A | Water deionized | 45.97 |
|  | Tetrasodium EDTA [1] | 0.05 |
|  | Guar Hydroxypropyltrimonium Chloride [2] | 0.05 |
|  | Polyquaternium-10 [3] | 0.075 |
| B | NaOH 10% aqueous sol. | 0.3 |
| C | Ammonium Lauryl Sulfate [4] | 34 |
|  | Ammonium Laureth Sulfate [5] | 9.25 |
|  | Cocamidopropyl Betaine [6] | 2 |
|  | Dimethicone (&) C12-13 Pareth-4 (&) C12-13 Pareth-23 (&) Salicylic Acid [7] | 2.5 |
| D | Cetyl Alcohol [8] | 1.2 |
|  | Cocamide MEA [9] | 1.5 |
|  | Glycol Distearate [10] | 2 |
| E | Methylchloroisothiazolinone & Methylisothiazolinone [11] | 0.1 |
|  | D-Panthenol 75% [12] | 0.1 |
|  | Water deionized | 0.3 |
| F | Sodium Chloride 25% aqueous sol. | 0.6 |

[1] EDET A B Powder, Origin: BASF
[2] Jaguar C14 S, Origin: Rhodia
[3] Ucare Polymer JR-400, Origin: Noveon
[4] Sulfetal LA B-E, Origin: Zschimmer & Schwarz
[5] Zetesol LA, Origin: Zschimmer & Schwarz
[6] Tego Betain F 50, Origin: Evonik
[7] Xiameter MEM-1691, Origin: Dow Corning
[8] Lanette 16, Origin: BASF
[9] Comperlan 100, Origin: Cognis
[10] Cutina AGS, Origin: Cognis
[11] Kathon CG, Origin: Rohm & Haas
[12] D-Panthenol, Origin: Roche The shampoo is prepared by dispersed in water and Tetrasodium EDTA, Guar Hydroxypropyltrimonium Chloride and Polyquaternium-10. NaOH 10% solution (Phase B) is added once Phase A is homogeneous. Then, the premixed Phase C is added. and mixture is heated to 75° C. Phase D ingredients are added and mixed till homogeneous. The mixture is cooled down. At 45° C., Phase E ingredients are added while mixing. Final viscosity is adjusted with 25% NaCl solution and pH of 5.5-6 is adjusted with 10% NaOH solution The perfumed pearly shampoo is prepared by adding 0.4 to 0.8% by weight, relative to the total weight of the shampoo, of the invention's perfuming composition of example 5 into the unperfumed shampoo formulation of Table 7 under gentle shaking.

Example 14

Preparation of a Structured Shower Gel Comprising the Invention's Composition

TABLE 8

Composition of the milky shower gel formulation

| Ingredients | Amount (% wt) |
|---|---|
| WATER deionised | 49.350 |
| Tetrasodium EDTA [1] | 0.050 |
| Acrylates Copolymer[2] | 6.000 |
| Sodium C12-C15 Pareth Sulfate [3] | 35.000 |
| Sodium Hydroxide 20% aqueous solution | 1.000 |
| Cocamidopropyl Betaine[4] | 8.000 |
| Methylchloroisothiazolinone and Methylisothiazolinone[5] | 0.100 |
| Citric Acid (40%) | 0.500 |

6) EDETA B POWDER; trademark and origin: BASF
7) CARBOPOL AQUA SF-1 POLYMER; trademark and origin: NOVEON
8) ZETESOL AO 328 U; trademark and origin: ZSCHIMMER & SCHWARZ
9) TEGO-BETAIN F 50; trademark and origin: GOLDSCHMIDT
10) KATHON CG; tradeark and origin: ROHM & HASS The transparent shower gel is prepared by adding 0.5 to 1.5% by weight, relative to the total weight of the shower gel, of the invention's perfuming composition of example 5 into the unperfumed shower gel formulation of Table 8 under gentle shaking.

Example 15

Preparation of Anhydrous Antiperspirant Spray Formulations Comprising the Invention's Composition

TABLE 9

Composition of the anhydrous antiperspirant spray formulation

| Ingredients | Amount (% wt) |
|---|---|
| Cyclomethicone [1] | 53.0 |
| Isopropyl myristate | 9.0 |
| Silica [2] | 1.0 |
| Quaternium-18-hectorite [3] | 3.3 |
| Aluminium chlorohydrate [4] | 32.7 |
| Perfume oil | 1 |

[1] Dow Corning ® 345 Fluid; origin: Dow Corning
[2] Aerosil ® 200 ; origin: Evonik
[3] Bentone ® 38; origin: Elementis Specialities
[4] Micro Dry Ultrafine; origin: Reheis Anhydrous antiperspirant spray formulation is prepared by using a high speed stirrer. Silica and Quaternium-18-hectorite are added to the mixture of isopropyl myristate and cyclomethicone. Once completely swollen, aluminium chlorohydrate is added portion-wise under stirring until the mixture becomes homogeneous and without lumps. Then a perfume oil being the invention's perfuming composition of example 5 is added.

Example 16

Preparation of Deodorant Spray Emulsion Formulations Comprising the Invention's Composition

TABLE 10

| Composition of deodorant spray emulsion formulation | |
|---|---|
| Ingredients | Amount (% wt) |
| Ethanol (95%) | 89.25 |
| Triclosan [1] | 0.25 |
| Isopropyl myristate | 9.00 |
| Invention's perfuming composition of Example 5 | 1.5 |

[1] Irgasan ® DP 300; origin: BASF
[2] mixture of Compounds 2a/2b ca. 45:55

Deodorant spray emulsion formulation is prepared by mixing and dissolving all the ingredients according to the sequence of Table 10. Aerosol cans are filled, and the propellant is crimped and added. Aerosol filling: 40% active solution 60% propane/butane (2.5 bar).

Example 19

Preparation of Deodorant Stick Formulations Comprising the Invention's Composition

TABLE 11

| Composition of Deodorant stick formulation | | |
|---|---|---|
| Phase | Ingredients | Amount (% wt) |
| A | Stearic acid | 5.00 |
|  | 1,2-Propylene glycol | 41.45 |
|  | Sodium hydroxide (20% aqueous solution) | 4.20 |
|  | Water | 30.00 |
|  | Tetrasodium EDTA [1] | 0.10 |
|  | Ceteareth-25 [2] | 1.50 |
|  | PPG-3 Myristyl ether [3] | 1.50 |
| B | 1,2-Propylene glycol | 15.00 |
|  | Triclosan [4] | 0.25 |
| C | Perfume oil | 1 |

[1] Edeta ® B Power; origin: BASF
[2] Cremophor ® A25; origin: BASF
[3] Tegosoft ® APM; origin: Evonik
[4] Irgasan ® DP 300; origin: BASF Deodorant stick formulation is obtained by weighing all the components of Part A and heating to 70-75° C. Ceteareth-25 is added once the other Part A ingredients are mixed and heated. When the Ceteareth-25 is dissolved, stearic acid is added. Part B is prepared by dissolving Triclosan in 1,2-propylene glycol. Evaporated water is compensated. Then, slowly, under mixing, Part B is poured into Part A. A perfume oil being the invention's perfuming composition of example 5 (Phase C) is added under gentle shaking. To stock, a plastic bag is put into the bucket to be sealed after cooling. Moulds were filled at about 70° C.

Example 18

Preparation of Deodorant Roll-on Formulations Comprising the Invention's Composition

TABLE 12

| Composition of deodorant roll-on formulation | | |
|---|---|---|
| Phase | Ingredients | Amount (% wt) |
| A | Water | 50.00 |
|  | Hydroxyethylcellulose [1] | 0.70 |
| B | Ethanol (95%) | 40.00 |
|  | 1,2-Propylene glycol | 5.00 |
|  | Triclosan [2] | 0.30 |
| C | PEG-40 hydrogenated castor oil [3] | 3.00 |
| D | Invention's perfuming composition of Example 5 | 1 |

[1] Natrosol ® 250 H; origin: Ashland
[2] Irgasan ® DP 300; origin: BASF
[3] Cremophor ® RH 40; origin: BASF Part A is prepared by sprinkling little-by-little the hydroxyethylcellulose into the water, whilst rapidly stirring with a turbine until the hydroxyethylcellulose is entirely swollen giving a limpid gel. Part B is slowly poured into Part A, whilst continuing stirring until the entire mixture is homogeneous. Then Parts C and D are added under gentle shaking.

Example 19

Preparation of Day Cream Base O/W Emulsions Comprising the Invention's Composition

TABLE 13

| Composition of day cream base O/W emulsion formulation | | |
|---|---|---|
| Phase | Ingredients | Amount (% wt) |
| A | Steareth-2 (and) PEG-8 Distearate[1] | 5.0 |
|  | Cetyl alcohol | 0.5 |
|  | Ceteth-20 (AND) glyceryl stearate (and) PEG-6 stearate (and) Steareth-20 [2] | 4.0 |
|  | Squalan [3] | 1.0 |
|  | Paraffin oil [4] | 2.0 |
|  | Petrolatum [5] | 5.5 |
| B | Deionized water | 75.9 |
|  | Propylene glycol | 5.0 |
| C | Phenoxyethanol (AND) Piroctone olamine [6] | 0.6 |
| D | Sodium carbomer [7] | 0.2 |
| E | Perfume oil | 0.3 |

[1] Arlacel ® 985; origin: Croda
[2] Tefose ® 2561; origin: Gattefossé
[3] Biolip P 90; origin: Gattefossé
[4] Mineral oil 30-40 CPS
[5] Petroleum jelly
[6] Nipaguard ® PO 5; origin: Clariant
[7] PNC 400

Day cream base O/W emulsions is prepared by heating Phases A and B separately to 70-75° C. Phase A is added to Phase B, then vacuum is applied. The mixture is stirred and cooled to 55° C. for 15 min. After cooling to room temperature, phenoxyethanol (and) piroctone olamine (Part C) are added when a temperature of 45° C. is reached. The mixture is stirred for 5 min before sodium carbomer (Part D) and a perfume oil being the invention's perfuming composition of Example 5 (Part E) is added. The mixture is stirred for 3 min, then the stirring was stopped for 15 min. When the temperature of the mixture reaches 30° C., the stirring is resumed for another 15 min until the cream becomes homogeneous, glossy and without lumps. If necessary the pH is adjusted to 6.70-7.20 with Glydant, Phenonip or Nipaguard PO5 or to 6.30-7.00 with Nikkoguard.

The invention claimed is:

1. A method to confer, enhance, improve or modify the odor properties of a perfuming composition or a perfumed article, which method comprises adding to said composition or article an effective amount of a composition of matter comprising:

i) 40 to 60% w/w of compound of formula (I)

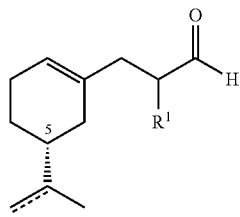

in the form of any one of its stereoisomers or as a mixture thereof, wherein carbon 5 of the cyclohexenyl group has an absolute R configuration, the dotted line represents a carbon-carbon single bond or a carbon-carbon double bond and $R^1$ represents a hydrogen atom or a $C_{1-3}$ alkyl group; and ii) 40 to 60% w/w of compound of formula (II)

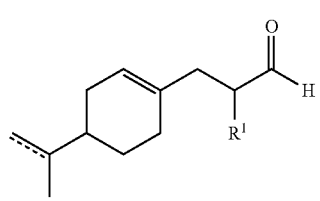

in the form of any one of its stereoisomers or as a mixture thereof, wherein the dotted line and $R^1$ have the same meaning as in formula (I);

the percentage being relative to the total weight of the composition of matter.

2. The method according to claim 1, wherein the dotted line in formula I or formula II is a carbon-carbon single bond.

3. The method according to claim 1, wherein $R^1$ in formula I or formula II is a hydrogen atom or a methyl group.

4. The method according to claim 1, wherein the composition of matter comprises:

i) 40 to 60% w/w of compound of formula (I), wherein the compound of formula (I) is according to formula (III)

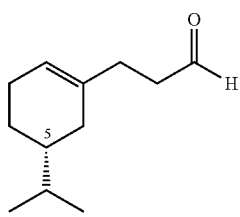

wherein carbon 5 of the cyclohexenyl group has an absolute R configuration; and ii) 40 to 60% w/w of compound of formula (II), wherein the compound of formula (II) is according to formula (IV)

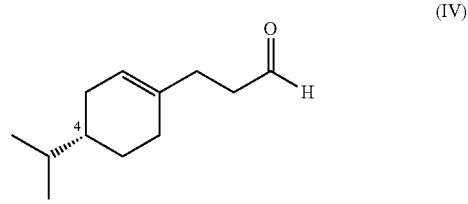

wherein carbon 4 of the cyclohexenyl group has an absolute S configuration;

the percentage being relative to the total weight of the composition of matter.

5. The method according to claim 4, wherein the compound of formula (III) has an enantiomeric excess (ee) of at least 80%.

6. The method according to claim 4, wherein the compound of formula (IV) has an enantiomeric excess (ee) of at least 50%.

7. A composition of matter comprising:

i) 40 to 60% w/w of compound of formula (I)

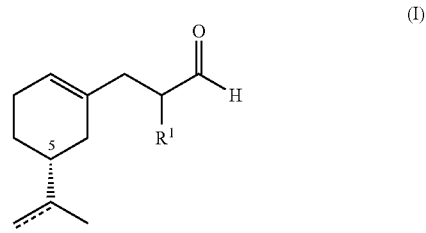

in the form of any one of its stereoisomers or as a mixture thereof, wherein carbon 5 of the cyclohexenyl group has an absolute R configuration, the dotted line represents a carbon-carbon single bond or a carbon-carbon double bond and $R^1$ represents a hydrogen atom or a $C_{1-3}$ alkyl group; and ii) 40 to 60% w/w of compound of formula (II)

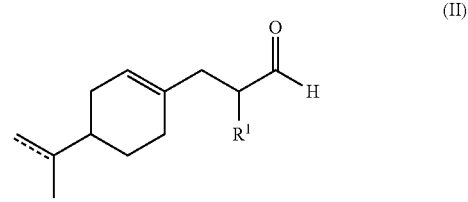

in the form of any one of its stereoisomers or as a mixture thereof, wherein the dotted line and $R^1$ have the same meaning as in formula (I);

the percentage being relative to the total weight of the composition of matter.

8. A perfuming composition comprising
  i) at least the composition of matter according to claim 7;
  ii) at least one ingredient selected from the group consisting of a perfumery carrier and a perfumery base; and
  iii) optionally at least one perfumery adjuvant.

9. A perfumed consumer product comprising the perfuming composition according to claim 8.

10. The perfumed consumer product according to claim 9, wherein the perfumed consumer product is a perfume, a fabric care product, a body-care product, a cosmetic preparation, a skin-care product, an air care product or a home care product.

11. The perfumed consumer product according to claim 10, wherein the perfumed consumer product is a fine perfume, a splash or eau de perfume, a cologne, a shave or after-shave lotion, a liquid or solid detergent, a fabric softener, a fabric refresher, an ironing water, a paper, a bleach, a carpet cleaners, curtain-care products, a shampoo, a coloring preparation, a color care product, a hair shaping product, a dental care product, a disinfectant, an intimate care product, a hair spray, a vanishing cream, a deodorant or antiperspirant, hair remover, a tanning or sun product, nail products, a skin cleansing, a makeup, a perfumed soap, shower or bath mousse, oil or gel, foot/hand care products, a hygiene product, an air freshener, a "ready to use" powdered air freshener, a mold remover, a furnisher care, a wipe, a dish detergent or hard-surface detergent, a leather care product, or a car care product.

12. The method according to claim 1, wherein the composition of matter possesses odor properties comprising rosy and/or floral notes.

13. The method according to claim 1, wherein the composition of matter possesses odor properties lacking citrus, violet leaf/pyrazine, fruity, watery, and/or aldehydic notes.

* * * * *